US010608571B2

(12) United States Patent
Jiang et al.

(10) Patent No.: US 10,608,571 B2
(45) Date of Patent: Mar. 31, 2020

(54) OPEN-WINDING MOTOR DRIVE TOPOLOGY AND MODULATION METHOD THEREOF

(71) Applicant: Huazhong University of Science and Technology, Wuhan, Hubei (CN)

(72) Inventors: Dong Jiang, Hubei (CN); An Li, Hubei (CN); Ronghai Qu, Hubei (CN); Wubin Kong, Hubei (CN); Zixiang Yu, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 16/312,750

(22) PCT Filed: Feb. 11, 2018

(86) PCT No.: PCT/CN2018/076212
§ 371 (c)(1),
(2) Date: Dec. 21, 2018

(87) PCT Pub. No.: WO2019/140728
PCT Pub. Date: Jul. 25, 2019

(65) Prior Publication Data
US 2019/0229668 A1    Jul. 25, 2019

(30) Foreign Application Priority Data
Jan. 19, 2018    (CN) .......................... 2018 1 00516263

(51) Int. Cl.
*H02P 27/08*    (2006.01)
*H02P 21/22*    (2016.01)
(Continued)

(52) U.S. Cl.
CPC .............. *H02P 27/08* (2013.01); *H02P 21/22* (2016.02); *H02P 25/18* (2013.01); *H02P 25/22* (2013.01)

(58) Field of Classification Search
CPC .... H02P 27/04; H02P 1/00; H02P 1/04; H02P 1/10; H02P 1/12; H02P 1/163; H02P 1/18;
(Continued)

(56) References Cited

U.S. PATENT DOCUMENTS 8,575,885 B2 * 11/2013 Okumatsu ........... H02P 29/0243
310/132

FOREIGN PATENT DOCUMENTS

CN          102882458 A  *  1/2013  .............. H02P 21/00
CN          102882458 A      1/2013
(Continued)

OTHER PUBLICATIONS

International Search Report and Written Opinion issued in PCT/CN2018/076212, dated Jun. 1, 2018.

*Primary Examiner* — Antony M Paul
(74) *Attorney, Agent, or Firm* — Hamre, Schumann, Mueller & Larson, P.C.

(57) ABSTRACT

The present invention discloses an open-winding motor drive topology and a modulation method thereof. Each bridge arm includes an upper bridge arm power switching device and a lower bridge arm power switching device, an upper node of the upper bridge arm power switching device is connected to a DC bus voltage, a lower node of the lower bridge arm power switching device is connected to a power ground, and a lower node of the upper bridge arm power switching device and an upper node of the lower bridge arm power switching device are connected as an output node of the bridge arm; the output node of the first bridge arm is connected to a left node of a A-phase stator winding of the open-winding motor, the output node of the second bridge arm is connected to a right node of the A-phase stator winding and a left node of a B-phase stator winding of the open-winding motor, the output node of the third bridge arm (Continued)

is connected to a right node of the B-phase stator winding and a left node of a C-phase stator winding of the open-winding motor, and the output node of the fourth bridge arm is connected to a right node of the C-phase stator winding of the open-winding motor. The invention improves the power density of the drive, thereby ensuring the working performance of the motor.

8 Claims, 2 Drawing Sheets

(51) Int. Cl.
  *H02P 25/18* (2006.01)
  *H02P 25/22* (2006.01)
(58) Field of Classification Search
  CPC .... H02P 1/24; H02P 1/26; H02P 1/265; H02P 1/42; H02P 1/423; H02P 1/465; H02P 1/44; H02P 6/00; H02P 6/002; H02P 6/08; H02P 6/085; H02P 6/14; H02P 6/185; H02P 6/187; H02P 6/20; H02P 11/06; H02P 21/00; H02P 21/0035; H02P 21/0046; H02P 21/12; H02P 23/00; H02P 27/00; H02P 27/06; H02P 25/00
  USPC ..... 318/400.01, 400.02, 700, 701, 721, 727, 318/800, 801, 599, 811; 388/800, 819
  See application file for complete search history.

(56) References Cited

FOREIGN PATENT DOCUMENTS

| | | | | | |
|---|---|---|---|---|---|
| CN | 104883115 | A | * | 9/2015 | ............ H02P 27/12 |
| CN | 105790650 | A | | 7/2016 | |
| CN | 105811834 | A | * | 7/2016 | ............ H02P 27/12 |
| CN | 105811834 | A | | 7/2016 | |
| CN | 106208894 | A | | 12/2016 | |

* cited by examiner

ACCOMPANYING FIGURES

OPEN-WINDING MOTOR DRIVE TOPOLOGY AND MODULATION METHOD THEREOF

BACKGROUND OF THE INVENTION

Technical Field

The present invention belongs to the field of AC motor and drive control, and more particularly relates to an open-winding motor drive topology and a modulation method thereof.

Description of the Related Art

The application of a power electronic converter as a motor drive is a main method for modern electric drives. At present, most motors, such as permanent magnet motors and AC asynchronous motors, adopt three-phase star connection. The reason why most motors adopt the star connection method is to suppress the zero-sequence harmonic current. The three-phase half-bridge inverter topology is structurally capable of naturally suppressing the zero-sequence current component, so that the motor can achieve better working performance. Therefore, the method of using a three-phase half-bridge inverter topology as a topology of the motor drive has become very mature and has been commercialized. However, in recent years, more and more novel motors have adopted a winding method of open winding, that is, the three-phase windings contain six winding terminals, and there are two main reasons for this:

① High DC bus voltage utilization is required. Some novel open-winding motors (such as open-winding permanent magnet motors) require a higher back-EMF, and thus, the drive is required to provide a higher DC bus voltage. The three-phase half-bridge inverter topology can only provide a DC bus voltage utilization of 1.15 times, while the open-winding motors can adopt a three-phase H-bridge inverter topology, which can provide a DC bus voltage utilization of 2 times. However, this three-phase H-bridge inverter topology includes six bridge arms, and thus the number of the bridge arms is twice that of the bridge arms of the three-phase half-bridge inverter topology, resulting in high cost and low powder density; and ② A zero-sequence current path is required. Some concentrative fully pitched winding permanent magnet motors need to input a zero-sequence AC component to increase the average torque, and thus a zero-sequence current path is required; some novel open-winding motors differ greatly from conventional motors in terms of drive strategy, such as stator DC excitation motors and novel switched reluctance motors. These novel motors require zero-sequence DC current injection, and thus, a zero-sequence current path is required. However, the three-phase half-bridge inverter topology does not have a zero-sequence current path, which blocks the required zero-sequence current component while suppressing the zero-sequence harmonic current, so that these novel motor cannot work properly. In contrast, these novel motors can be driven by the three-phase H-bridge inverter topology because of the control capability of zero-sequence current.

Therefore, the three-phase H-bridge inverter topology is the most common topology for the open-winding motor drive. Compared with the three-phase half-bridge topology, the three-phase H-bridge inverter topology doubles the number of power devices of the drive as well as the number of corresponding auxiliary devices, which results in greatly increased cost and volume of the drive and low power density. This is a very serious problem with current open winding motor drives.

SUMMARY OF THE INVENTION

In view of the defects in the prior art, the present invention aims to solve the technical problem that compared with the three-phase half-bridge topology, the three-phase H-bridge inverter topology doubles the number of power devices of the drive as well as the number of corresponding auxiliary devices, which results in greatly increased cost and volume of the drive and low power density.

In order to achieve the above objective, according to a first aspect of the present invention, there is provided an open-winding motor drive topology, which comprises: a first a first bridge arm, a second bridge arm, a third bridge arm and a fourth bridge arm; each bridge arm includes an upper bridge arm power switching device and a lower bridge arm power switching device, in which an upper node of the upper bridge arm power switching device is connected to a DC bus voltage, a lower node of the lower bridge arm power switching device is connected to a power ground, and a lower node of the upper bridge arm power switching device and an upper node of the lower bridge arm power switching device are connected as an output node of the bridge arm; the output node of the first bridge arm is connected to a left node of a A-phase stator winding of the open-winding motor, the output node of the second bridge arm is connected to a right node of the A-phase stator winding and a left node of a B-phase stator winding of the open-winding motor, the output node of the third bridge arm is connected to a right node of the B-phase stator winding and a left node of a C-phase stator winding of the open-winding motor, and the output node of the fourth bridge arm is connected to a right node of the C-phase stator winding of the open-winding motor.

Optionally, currents flowing into the respective bridge arms are expressed by stator currents of the stator DC excitation motor:

$$\begin{cases} i_1 = -i_A = -\sqrt{2}\, I_{AC}\sin\omega t - I_{DC} \\ i_2 = i_A - i_B = \sqrt{6}\, I_{AC}\sin(\omega t + 30°) \\ i_3 = i_B - i_C = \sqrt{6}\, I_{AC}\sin(\omega t - 90°) \\ i_4 = i_C = \sqrt{2}\, I_{AC}\sin(\omega t + 120°) + I_{DC} \end{cases}$$

wherein $i_1$, $i_2$, $i_3$ and $i_4$ respectively represent currents flowing into the first bridge arm, the second bridge arm, the third bridge arm and the fourth bridge arm; $i_A$, $i_B$ and $i_C$ respectively represent currents of a A-phase stator winding, a B-phase stator winding and a C-phase stator winding; $I_{AC}$ represents an effective value of a AC current component in the stator winding current, $I_{DC}$ represents an effective value of a DC current component in the stator winding current, $I_{DC}$ belongs to a zero-sequence current component in the three-phase stator currents of the motor, the zero-sequence current component being the same current component in the three-phase stator currents, ω represents an electrical angular velocity, and t represents the time.

Optionally, currents flowing into the first bridge arm and the fourth bridge arm are each a sinusoidal current with a DC bias, and the current stresses of the bridge arm power devices are related to all components in the stator current; currents flowing into the second bridge arm and the third bridge arm are each a sinusoidal current, and the current stresses of the bridge arm power devices are independent of the DC component in the stator current, i.e., the zero-sequence current component; the zero-sequence current component does not flow into the second bridge arm and the third bridge arm, and when the required zero-sequence current component of the motor is large, the current stresses of the second bridge annrm and the third bridge arm are relatively small, thereby allowing small-capacity power devices to be selected and reducing the cost.

Optionally, when three-phase stator voltages are set to $V_A$, $V_B$ and $V_C$, duty cycles of the upper bridge arm power switching devices of the respective bridge arms are:

when $-\frac{\pi}{6} + k\pi \leq \theta < \frac{\pi}{6} + k\pi$, $D_{leg1} = \frac{1}{2}\left(1 + \frac{V_{\alpha\beta}}{V_D}\cos\theta + \frac{3V_\gamma}{V_D}\right)$, $D_{leg2} = \frac{1}{2}\left(1 - \frac{V_{\alpha\beta}}{V_D}\cos\theta + \frac{V_\gamma}{V_D}\right)$, $D_{leg3} = \frac{1}{2}\left(1 - \frac{\sqrt{3}V_{\alpha\beta}}{V_D}\sin\theta - \frac{V_\gamma}{V_D}\right)$, and $D_{leg4} = \frac{1}{2}\left(1 + \frac{V_{\alpha\beta}}{V_D}\cos\theta - \frac{3V_\gamma}{V_D}\right)$;

when $\frac{\pi}{6} + k\pi \leq \theta < \frac{\pi}{2} + k\pi$, $D_{leg1} = \frac{1}{2}\left(1 + \frac{V_{\alpha\beta}}{V_D}\sin(\theta + 30°) + \frac{3V_\gamma}{V_D}\right)$, $D_{leg2} = \frac{1}{2}\left(1 + \frac{\sqrt{3}V_{\alpha\beta}}{V_D}\sin(\theta - 60°) + \frac{V_\gamma}{V_D}\right)$, $D_{leg3} = \frac{1}{2}\left(1 - \frac{V_{\alpha\beta}}{V_D}\sin(\theta + 30°) - \frac{V_\gamma}{V_D}\right)$, and $D_{leg4} = \frac{1}{2}\left(1 + \frac{V_{\alpha\beta}}{V_D}\sin(\theta + 30°) - \frac{3V_\gamma}{V_D}\right)$;

when $\frac{\pi}{2} + k\pi \leq \theta < \frac{5\pi}{6} + k\pi$, $D_{leg1} = \frac{1}{2}\left(1 + \frac{\sqrt{3}V_{\alpha\beta}}{V_D}\sin(\theta + 60°) + \frac{3V_\gamma}{V_D}\right)$, $D_{leg2} = \frac{1}{2}\left(1 + \frac{V_{\alpha\beta}}{V_D}\sin(\theta - 30°) + \frac{V_\gamma}{V_D}\right)$, $D_{leg3} = \frac{1}{2}\left(1 - \frac{V_{\alpha\beta}}{V_D}\sin(\theta - 30°) - \frac{V_\gamma}{V_D}\right)$, $D_{leg4} = \frac{1}{2}\left(1 + \frac{\sqrt{3}V_{\alpha\beta}}{V_D}\sin(\theta + 60°) - \frac{3V_\gamma}{V_D}\right)$;

wherein $D_{leg1}$, $D_{leg2}$, $D_{leg3}$ and $D_{leg4}$ respectively represent duty cycles of the upper bridge arm power switching devices of the first bridge arm, the second bridge arm, the third bridge arm and the fourth bridge arm, $\theta$ represents an angle between a voltage vector $V_{\alpha\beta}$ and the $\alpha$ axis in a stationary $\alpha\beta\gamma$ coordinate system, $V_{\alpha\beta}=\sqrt{V_\alpha^2+V_\beta^2}$, $\theta$=arctan $(V_\beta/V_\alpha)$, and k is an integer;

$V_A$, $V_B$ and $V_C$ are voltage vectors converted from the three-phase stator voltages $V_A$, $V_B$ and $V_C$ in the respective axes of the $\alpha\beta\gamma$ axis space, and a relationship between $V_A$, $V_B$ and $V_C$ and $V_\alpha$, $V_\beta$ and $V_\gamma$ is:

$$\begin{bmatrix} V_\alpha \\ V_\beta \\ V_\gamma \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} V_a \\ V_b \\ V_c \end{bmatrix}.$$

According to a second aspect of the present invention, there is provided a modulation method for the open-winding motor drive topology according to the second aspect of the present invention, which comprises:

converting a A-phase stator voltage $V_A$, a B-phase stator voltage $V_B$ and a C-phase stator voltage $V_C$ required to be generated by the open-winding motor drive into voltage vectors $V_\alpha$, $V_\beta$ and $V_\gamma$ in respective axes of the $\alpha\beta\gamma$ axis space, $V_A$, $V_B$ and $V_C$ being determined by the closed-loop control output of a A-phase stator current, a B-phase stator current and a C-phase stator current; determining sixteen voltage vectors that is capable of being generated by the open-winding motor drive topology in the $\alpha\beta\gamma$ axis space; selecting seven voltage vectors of the sixteen voltage vectors to synthesize required $V_\alpha$, $V_\beta$ and $V_\gamma$; according to the selected seven voltage vectors and $V_\alpha$, $V_\beta$ and $V_\gamma$, determining a modulation method in the open-winding motor drive topology to control duty cycles of the power switching devices of the respective bridge arms such that the A-phase stator voltage $V_A$, the B-phase stator voltage $V_B$ and the C-phase stator voltage $V_C$ are generated when the motor works properly.

Optionally, the sixteen voltage vectors are respectively set to $V_1$ to $V_{16}$, each corresponding to a combination of switching states of power switching devices on the respective bridge arms;

when selecting seven voltage vectors of the sixteen voltage vectors to synthesize required $V_\alpha$, $V_\beta$ and $V_\gamma$:

$$T_s \cdot V_{\alpha\beta} = T_x \cdot V_x + T_y \cdot V_y + \frac{T_0}{2} \cdot (V_1 + V_{16})$$

where $T_s$ represents a switching period, $T_x$ represents an effective action time of $V_x$, $T_y$ represents an effective action time of $V_y$, $V_x$ and $V_y$ represents two effective vectors of the motor voltage vector $V_{\alpha\beta}$, $V_{\alpha\beta}=\sqrt{V_\alpha^2+V_\beta^2}$, $V_x$ and $V_y$ takes two of the sixteen voltage vectors $V_1$ to $V_{16}$ according to an angle $\theta$ ($\theta$=arctan$(V_\beta/V_\alpha)$ between the voltage vector $V_{\alpha\beta}$ and the $\alpha$ axis in the stationary $\alpha\beta\gamma$ coordinate system, $T_0/2$ represents an effective time of the zero vectors $V_1$ and $V_{16}$, and $T_s=T_x+T_y+T_0$;

when $V_\gamma > 0$, $V_\gamma = \frac{T_z}{T_s} \cdot (V_9 + V_{13} + V_{15})$, when $V_\gamma < 0$, $V_\gamma = \frac{T_z}{T_s} \cdot (V_2 + V_4 + V_8)$, $T_z$ represents an action time of three effective vectors;

when $V_\gamma > 0$, the seven voltage vectors are $V_x$、$V_y$、$V_1$、$V_{16}$、$V_9$、$V_{13}$ and $V_{15}$, and when $V_\gamma < 0$, the seven voltage vectors are $V_x$、$V_y$、$V_1$、$V_{16}$、$V_2$、$V_4$ and $V_8$;

a relationship between $V_A$, $V_B$ and $V_C$ and $V_\alpha$, $V_\beta$ and $V_\gamma$ is:

$$\begin{bmatrix} V_\alpha \\ V_\beta \\ V_\gamma \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} V_a \\ V_b \\ V_c \end{bmatrix}.$$

The modulation method of claim 6, characterized in that, when $-\frac{\pi}{6} + 2j\pi \leq \theta < \frac{\pi}{6} + 2j\pi$, $V_x$ is $V_{12}$, $V_y$ is $V_{10}$, $$\frac{T_x}{T_s} = -\frac{V_{\alpha\beta}}{V_D}\sin\left(\theta - \frac{\pi}{6}\right), \frac{T_y}{T_s} = \frac{V_{\alpha\beta}}{V_D}\sin\left(\theta + \frac{\pi}{6}\right);$$

when $\frac{\pi}{6} + 2j\pi \leq \theta < \frac{\pi}{2} + 2j\pi$, $V_x$ is $V_{10}$, $V_y$ is $V_{14}$, $$\frac{T_x}{T_s} = \frac{V_{\alpha\beta}}{V_D}\cos\theta, \frac{T_y}{T_s} = \frac{V_{\alpha\beta}}{V_D}\sin\left(\theta - \frac{\pi}{6}\right);$$

when $\frac{\pi}{2} + 2j\pi \leq \theta < \frac{5\pi}{6} + 2j\pi$, $V_x$ is $V_{14}$, $V_y$ is $V_5$, $$\frac{T_x}{T_s} = \frac{V_{\alpha\beta}}{V_D}\sin\left(\theta + \frac{\pi}{6}\right), \frac{T_y}{T_s} = -\frac{V_{\alpha\beta}}{V_D}\cos\theta;$$

when $\frac{5\pi}{6} + 2j\pi \leq \theta < \frac{7\pi}{6} + 2j\pi$, $V_x$ is $V_5$, $V_y$ is $V_7$, $$\frac{T_x}{T_s} = \frac{V_{\alpha\beta}}{V_D}\sin\left(\theta - \frac{\pi}{6}\right), \frac{T_y}{T_s} = -\frac{V_{\alpha\beta}}{V_D}\sin\left(\theta + \frac{\pi}{6}\right);$$

when $-\frac{5\pi}{6} + 2j\pi \leq \theta < -\frac{\pi}{2} + 2j\pi$, $V_x$ is $V_7$, $V_y$ is $V_3$, $$\frac{T_x}{T_s} = -\frac{V_{\alpha\beta}}{V_D}\cos\theta, \frac{T_y}{T_s} = -\frac{V_{\alpha\beta}}{V_D}\sin\left(\theta - \frac{\pi}{6}\right);$$

when $-\frac{\pi}{2} + 2j\pi \leq \theta < -\frac{\pi}{6} + 2j\pi$, $V_x$ is $V_3$, $V_y$ is $V_{12}$, $$\frac{T_x}{T_s} = -\frac{V_{\alpha\beta}}{V_D}\sin\left(\theta + \frac{\pi}{6}\right), \frac{T_y}{T_s} = \frac{V_{\alpha\beta}}{V_D}\cos\theta;$$

j represents an integer, $V_D$ represents an DC bus voltage of the open-winding motor drive.

Optically, duty cycles of the upper bridge arm power switching devices of the respective bridge arms are controlled as follows:

when $-\frac{\pi}{6} + k\pi \leq \theta < \frac{\pi}{6} + k\pi$, $D_{leg1} = \frac{1}{2}\left(1 + \frac{V_{\alpha\beta}}{V_D}\cos\theta + \frac{3V_\gamma}{V_D}\right)$, $$D_{leg2} = \frac{1}{2}\left(1 - \frac{V_{\alpha\beta}}{V_D}\cos\theta + \frac{V_\gamma}{V_D}\right),$$

$$D_{leg3} = \frac{1}{2}\left(1 + \frac{\sqrt{3}\,V_{\alpha\beta}}{V_D}\sin\theta - \frac{V_\gamma}{V_D}\right),$$

$$D_{leg4} = \frac{1}{2}\left(1 + \frac{V_{\alpha\beta}}{V_D}\cos\theta - \frac{3V_\gamma}{V_D}\right);$$

when $\frac{\pi}{6} + k\pi \leq \theta < \frac{\pi}{2} + k\pi$, $$D_{leg1} = \frac{1}{2}\left(1 + \frac{V_{\alpha\beta}}{V_D}\sin(\theta + 30°) + \frac{3V_\gamma}{V_D}\right),$$

$$D_{leg2} = \frac{1}{2}\left(1 + \frac{\sqrt{3}\,V_{\alpha\beta}}{V_D}\sin(\theta - 60°) + \frac{V_\gamma}{V_D}\right),$$

$$D_{leg3} = \frac{1}{2}\left(1 - \frac{V_{\alpha\beta}}{V_D}\sin(\theta + 30°) - \frac{V_\gamma}{V_D}\right),$$

$$D_{leg4} = \frac{1}{2}\left(1 + \frac{V_{\alpha\beta}}{V_D}\sin(\theta + 30°) - \frac{3V_\gamma}{V_D}\right);$$

when $\frac{\pi}{2} + k\pi \leq \theta < \frac{5\pi}{6} + k\pi$, $$D_{leg1} = \frac{1}{2}\left(1 + \frac{\sqrt{3}\,V_{\alpha\beta}}{V_D}\sin(\theta + 60°) + \frac{3V_\gamma}{V_D}\right),$$

$$D_{leg2} = \frac{1}{2}\left(1 + \frac{V_{\alpha\beta}}{V_D}\sin(\theta - 30°) + \frac{V_\gamma}{V_D}\right),$$

$$D_{leg3} = \frac{1}{2}\left(1 - \frac{V_{\alpha\beta}}{V_D}\sin(\theta - 30°) - \frac{V_\gamma}{V_D}\right),$$

$$D_{leg4} = \frac{1}{2}\left(1 + \frac{\sqrt{3}\,V_{\alpha\beta}}{V_D}\sin(\theta + 60°) - \frac{3V_\gamma}{V_D}\right);$$

where $D_{leg1}$, $D_{leg2}$, $D_{leg3}$ and $D_{leg4}$ respectively represent duty cycles of the upper bridge arm power switching devices of the first, second, third and fourth bridge arms, and k is an integer.

In general, by comparing the above technical solution of the present inventive concept with the prior art, the present invention has the following beneficial effects:

1. the motor drive topology according to the present invention consists of four bridge arms, thereby reducing two bridge arms compared with the three-phase H-bridge inverter topology. Thus, the cost of the drive is greatly reduced, and the power density of the drive system is improved.
2. the topology according to the present invention includes not only positive or negative sequence currents (components other than the zero sequence current) paths, but also zero-sequence current paths. For example, in a stator DC excitation motor, DC current components of the same magnitude can flow in the three-phase windings for excitation. Thus, in this topology, the required forward or reverse zero-sequence current component can flow in the stator windings of the open-winding motor. Meanwhile, in this topology, a zero-sequence voltage component in the stator windings of the open-winding motor can be controlled, that is, the zero-sequence current can be controlled to a specified magnitude.
3. in the motor drive topology according to the present invention, currents flowing in the bridge arms are inconsistent with currents flowing in the conventional drive topology. The motor drive topology can reduce the current stresses of the bridge arms. Especially when the open-winding motor requires a large zero-sequence current, this zero-sequence current component does not flow in the second and third bridge arms of B and C, which greatly reduces the current capacity required by power devices of the second and third bridge arms, and further reduces the cost of the power devices.
4. with the motor drive modulation method according to the present invention, the motor drive topology has a DC bus voltage utilization of 2 times, that is, the fundamental phase voltage amplitude can reach the DC bus voltage. This DC bus voltage utilization is the same as that in the three-phase H-bridge inverter topology, which is greater than 1.15 times in the three-phase half-bridge inverter topology.
5. with the motor drive modulation method according to the present invention, the motor drive topology can be controlled to output required three-phase stator voltages. According to the selection of voltage vectors, it is ensured that no additional low-order harmonic components (for example, third harmonic) are generated in the output three-phase stator voltages, and thus, the stator windings of the open-winding motor have small current harmonic components, and the motor has good working characteristics.

BRIEF DESCRIPTION OF THE DRAWINGS

FIG. 4(2) shows a distribution of voltage vectors in the $\alpha\beta$ plane;

FIG. 5(2) shows a distribution of all voltage vectors projected into the $\alpha\beta$ plane;

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

Figure 1:
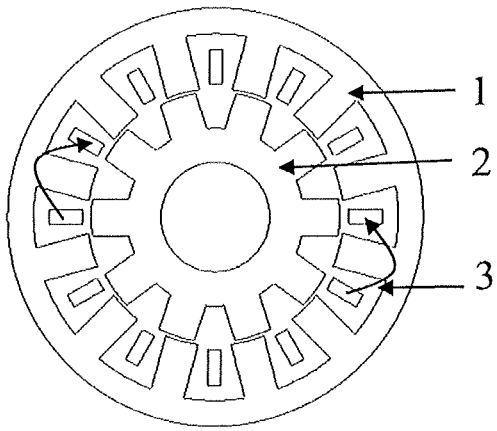
FIG. 1 is a schematic structural diagram of a stator DC excitation motor driven by an embodiment of a motor drive system provided by the present invention.

FIG. 1 is a schematic structural diagram of a stator DC excitation motor of a motor drive system according to the present invention. As shown in FIG. 1, the stator DC excitation motor includes a stator 1, a rotor 2, windings 3 and other common structural members of the motor such as a rotating shaft, a casing, an end cover and a position encoder.

The motor has the following characteristics: currents flowing in the stator windings include both sinusoidal AC components of 120° difference and DC components of the same magnitude. The reluctance motor adopts single-layer fractional slot non-overlapping concentrated windings, in which the sinusoidal AC component is used to generate a rotation magnetic potential, and the DC component is used to generate a rotating magnetic field. The reason why the stator DC excitation motor is selected as the driving object is that the stator currents of the novel motor includes zero-sequence current components required to be controlled, that is, the same DC components in the three-phase stator currents, which can well explain that the motor drive system according to the present invention can control zero-sequence voltage currents in the stator windings of the motor, so that required zero-sequence currents are generated in the stator windings and unwanted zero-sequence harmonic currents are suppressed.

Figure 2:
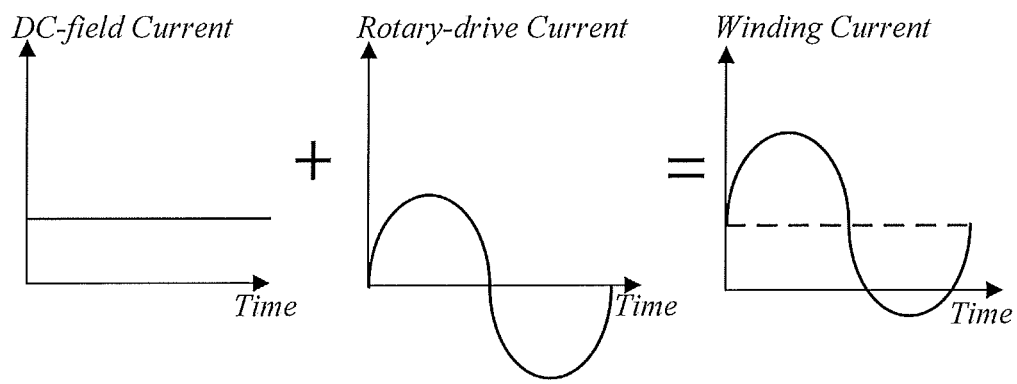
FIG. 2 shows a typical driving current waveform of a single-phase stator coil of the stator DC excitation motor driven by the embodiment of the present invention.

FIG. 2 shows a typical driving current waveform of a single-phase stator coil of the stator DC excitation motor according to the embodiment of the present invention. As shown in FIG. 2, a current in each of three-phase stator windings is superposed by a sinusoidal alternating current of 120° difference and a direct current of the same magnitude. The magnitudes of the three-phase stator currents are:

$$\begin{cases} i_A = \sqrt{2}\, I_{AC} \sin \omega t + I_{DC} \\ i_B = \sqrt{2}\, I_{AC} \sin(\omega t - 120°) + I_{DC} \\ i_C = \sqrt{2}\, I_{AC} \sin(\omega t + 120°) + I_{DC} \end{cases} \quad (1)$$

where $I_{AC}$ represents an effective value of the AC current component in the stator winding current, $I_{DC}$ represents an effective value of the DC current component in the stator winding current, $\omega$ represents an electrical angular velocity, and t represents the time.

Figure 3:
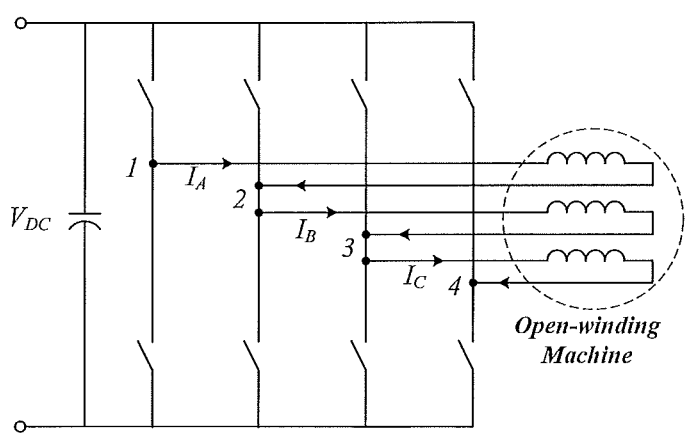
FIG. 3 shows a topology of a main circuit of a motor drive according to the present invention.

FIG. 3 shows a topology of a main circuit of a motor drive system according to the present invention, the main circuit comprising four switching bridge arms. The four switching bridge arms share one DC bus power supply, and are respectively a 1st bridge arm, a 2nd bridge arm, a 3rd bridge arm and a 4th bridge arm. Each switching bridge arm includes an upper bridge arm power switching device and a lower bridge arm power switching device (the power switching device can be a MOSFET or an IGBT with an anti-parallel diode).

For each bridge arm, an upper node of the upper bridge arm power switching device is connected to a DC bus voltage, a lower node of the lower bridge arm power switching device is connected to a power ground (GND), and a lower node of the upper bridge arm power switching device and an upper node of the lower bridge arm power switching device are connected as an output node of this bridge arm. Specifically, an output node of the 1st bridge arm is connected to a left node of a A-phase stator winding of the open-winding motor; an output node of the 2nd bridge arm is connected to a right node of the A-phase stator winding and a left node of a B-phase stator winding of the open-winding motor; an output node of the 3rd bridge arm is connected to a right node of the B-phase stator winding and a left node of a C-phase stator winding of the open-winding motor; an output node of the 4th bridge arm is connected to a right node of the C-phase stator winding of the open-winding motor. Therefore, according to Kirchhoff's current law, currents flowing into the respective bridge arms can be expressed by stator currents of the stator DC excitation motor as follows:

$$\begin{cases} i_1 = -i_A = -\sqrt{2}\, I_{AC} \sin \omega t - I_{DC} \\ i_2 = i_A - i_B = \sqrt{6}\, I_{AC} \sin(\omega t + 30°) \\ i_3 = i_B - i_C = \sqrt{6}\, I_{AC} \sin(\omega t - 90°) \\ i_4 = i_C = \sqrt{2}\, I_{AC} \sin(\omega t + 120°) + I_{DC} \end{cases} \quad (2)$$

It can be found that the magnitudes of the currents flowing into the 1st bridge arm and the 4th bridge arm are respectively the same in magnitude as the corresponding stator currents, and are each a sinusoidal current with a DC bias. The current stress of the respective bridge arm power device is related to all components in the stator current. The currents flowing into the 2st bridge arm and the 3th bridge arm are each a sinusoidal current, and the current stress of the respective bridge arm power device is independent of the DC component in the stator current, that is, independent of the zero-sequence current component. Thus, when the DC current is large, the topology can greatly reduce the current stresses of these two bridge arms, so that small-capacity power devices can be selected and the cost can be reduced.

The specific modulation method of the drive topology according to the present invention can be stated as:

According to Kirchhoff's voltage law, the relationship between three-phase stator voltages and output node voltages of the bridge arms is as follows:

$$\begin{bmatrix} V_a \\ V_b \\ V_c \end{bmatrix} = \begin{bmatrix} V_1 - V_2 \\ V_2 - V_3 \\ V_3 - V_4 \end{bmatrix} = \begin{bmatrix} S_1 - S_2 \\ S_2 - S_3 \\ S_3 - S_4 \end{bmatrix} \times V_D \quad (3)$$

wherein $V_a$, $V_b$ and $V_c$ respectively represent a A-phase stator voltage, a B-phase stator voltage and a C-phase stator voltage; $V_1$, $V_2$, $V_3$ and $V_4$ respectively represent output node voltages of the 1st bridge arm, the 2nd bridge arm, the 3rd bridge arm and the 4th bridge arm; $S_1$, $S_2$, $S_3$, and $S_4$ respectively represent upper switching tube states of the 1st bridge arm, the 2nd bridge arm, the 3rd bridge arm and the 4th bridge arm; and $V_D$ represents a DC bus supply voltage of the drive.

wherein the variable $S_i$ is defined as follows:

$$S_i = \begin{cases} 0 & \text{if the upper swithing tube of the } i\text{-}th \text{ bridge} \\ & \text{arm is turned off} \\ 1 & \text{if the upper swithing tube of the } i\text{-}th \text{ bridge} \\ & \text{arm is turned on} \end{cases} \quad (4)$$

where $i = 1, 2, 3, 4$

According to the Clark transform, the three-phase voltages in the abc axis can be converted into voltages $V_\alpha$, $V_\beta$ and $V_\gamma$ in the $\alpha\beta\gamma$ axis as follows:

$$\begin{bmatrix} V_\alpha \\ V_\beta \\ V_\gamma \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} V_a \\ V_b \\ V_c \end{bmatrix} \quad (5)$$

According to the formulas (3) and (5), the voltages in the $\alpha\beta\gamma$ axis can be expressed as:

$$\begin{cases} \frac{V_\alpha}{V_D} = \frac{2}{3} S_2 - S_2 + \frac{1}{3} S_4 \\ \frac{V_\beta}{V_D} = \frac{\sqrt{3}}{3} (S_2 - 2S_3 + S_4) \\ \frac{V_\gamma}{V_D} = \frac{1}{3} (S_1 - S_4) \end{cases} \quad (6)$$

Figure 4:
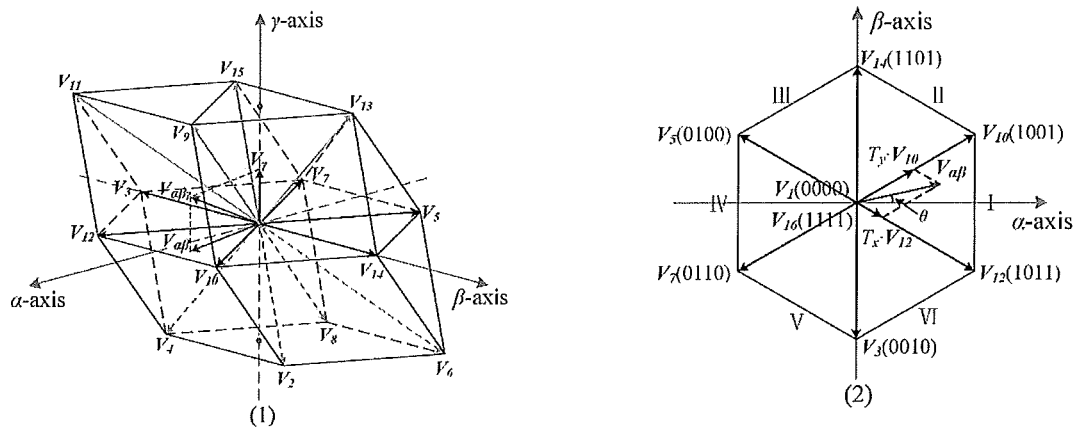
FIG. 4(1) shows a spatial distribution of 16 modulated voltage vectors in the $\alpha\beta\gamma$ space.

According to the state variable $S_i$ of each switching tube, 16 voltage vectors that can be generated by the four-bridge-arm converter in the $\alpha\beta\gamma$-axis space are given in Table 1. FIG. 4(1) shows spatial positions of these vectors in the $\alpha\beta\gamma$-axis space.

TABLE 1 voltage vectors of the four-bridge-arm converter in the $\alpha\beta\gamma$-axis space

| Vectors | $S_1S_2S_3S_4$ | $V_\alpha/V_D$ | $V_\beta/V_D$ | $V_\gamma/V_D$ |
|---|---|---|---|---|
| $V_1$ | 0000 | 0 | 0 | 0 |
| $V_2$ | 0001 | 1/3 | $1/\sqrt{3}$ | −1/3 |
| $V_3$ | 0010 | 0 | $-2/\sqrt{3}$ | 0 |
| $V_4$ | 0011 | 1/3 | $-1/\sqrt{3}$ | −1/3 |
| $V_5$ | 0100 | −1 | $1/\sqrt{3}$ | 0 |
| $V_6$ | 0101 | −2/3 | $2/\sqrt{3}$ | −1/3 |
| $V_7$ | 0110 | −1 | $-1/\sqrt{3}$ | 0 |
| $V_8$ | 0111 | −2/3 | 0 | −1/3 |
| $V_9$ | 1000 | 2/3 | 0 | 1/3 |
| $V_{10}$ | 1001 | 1 | $1/\sqrt{3}$ | 0 |
| $V_{11}$ | 1010 | 2/3 | $-2/\sqrt{3}$ | 1/3 |
| $V_{12}$ | 1011 | 1 | $-1/\sqrt{3}$ | 0 |
| $V_{13}$ | 1100 | −1/3 | $1/\sqrt{3}$ | 1/3 |
| $V_{14}$ | 1101 | 0 | $2/\sqrt{3}$ | 0 |
| $V_{15}$ | 1110 | −1/3 | $-1/\sqrt{3}$ | 1/3 |
| $V_{16}$ | 1111 | 0 | 0 | 0 |

As can be seen from FIG. 4(1), a reference voltage vector $V_{\alpha\beta\gamma}(V_\alpha, V_\beta, V_\gamma)$ is decomposed into a voltage vector $V_{\alpha\beta}(V_\alpha, V_\beta, 0)$ in the $\alpha\beta$ plane and a voltage vector $V_\gamma(0, 0, V_\gamma)$ in the $\gamma$ axis. FIG. 4(2) shows eight voltage vectors (including six effective voltage vectors and two zero vectors) in the $\alpha\beta$ plane. The six effective voltage vectors divide the voltage hexagon into six sectors. The voltage vector $V_{\alpha\beta}$ can be synthesized from two effective vectors ($V_x$ and $V_y$) and two zero vectors ($V_1$ and $V_{16}$).

According to the principle of volt-second balance:

$$T_s \cdot V_{\alpha\beta} = T_x \cdot V_x + T_y \cdot V_y + \frac{T_0}{2} \cdot (V_1 + V_{16}) \quad (7)$$

where $T_s$ represents a switching period, $T_x$ represents an effective action time of $V_x$, $T_y$ represents an effective action time of $V_y$, $V_x$ and $V_y$ represents two of the sixteen voltage vectors $V_1$ to $V_{16}$ according to the angle $\theta$ ($\theta$=arctan($V_\beta/V_\alpha$) between the voltage vector $V_{\alpha\beta}$ and the $\alpha$ axis in the stationary $\alpha\beta\gamma$ coordinate system (See Table 2 for details), $T_0/2$ represents an effective time of the zero vectors $V_1$ and $V_{16}$, and $T_s=T_x+T_y+T_0$.

For example, when $V_{\alpha\beta}$ is located in the sector I, the effective vector $V_x$ is $V_{12}$, and the effective vector $V_y$ is $V_{10}$. See Table 1 for details.

According to FIG. 4(1) and the formula (7), the effective action times of the respective voltage vectors are:

$$T_x = \frac{V_{\alpha\beta} \sin\left(\frac{\pi}{6} - \theta\right)}{\frac{2}{\sqrt{3}} V_D \sin\frac{\pi}{3}} \times T_s, \quad T_y = \frac{V_{\alpha\beta} \sin\left(\theta + \frac{\pi}{6}\right)}{\frac{2}{\sqrt{3}} V_D \sin\frac{\pi}{3}} \times T_s, \quad (8)$$

$$T_0 = T_s - T_x - T_y$$

where $\theta$=arctan($V_\beta/V_\alpha$) is the angle between the voltage vector $V_{\alpha\beta}$ and the $\alpha$ axis. $V_{\alpha\beta}=\sqrt{V_\alpha^2+V_\beta^2}$.

When $\theta$ is an arbitrary value, $T_x$ and $T_y$ always satisfy the following inequation relation:

$$\frac{T_x + T_y}{T_s} = \frac{2V_{\alpha\beta} \sin\frac{\pi}{6} \cos\theta}{\frac{2}{\sqrt{3}} V_D \sin\frac{\pi}{3}} = \frac{V_{\alpha\beta} \cos\theta}{V_D} \leq 1 \quad (9)$$

When θ is equal to 0, $V_{\alpha\beta}$ is the maximum value that satisfies the formula (9), namely:

$$V_{\alpha\beta} \leq V_D \quad (10)$$

It can be seen from the formula (10) that the fundamental phase voltage amplitude can reach the DC bus voltage ($V_D$) at the maximum, and thus, the motor drive topology has a DC bus voltage utilization of 2 times, in which the DC bus voltage utilization is defined as the maximum amplitude of the fundamental phase voltage divided by half of the DC bus voltage. Table 2 shows effective vectors ($V_x$ and $V_y$) and action times ($T_x$ and $T_y$) in different sectors, where j is an integer.

TABLE 2 effective vectors and action times thereof in different sectors

| Sector | Angle (θ) | Vectors x | Vectors y | $T_x/T_s$ | $T_y/T_s$ |
|---|---|---|---|---|---|
| I | $-\frac{\pi}{6}+2j\pi \leq \theta < \frac{\pi}{6}+2j\pi$ | $V_{12}$ (1011) | $V_{10}$ (1001) | $-\frac{V_{\alpha\beta}}{V_D}\sin(\theta-\frac{\pi}{6})$ | $\frac{V_{\alpha\beta}}{V_D}\sin(\theta+\frac{\pi}{6})$ |
| II | $\frac{\pi}{6}+2j\pi \leq \theta < \frac{\pi}{2}+2j\pi$ | $V_{10}$ (1001) | $V_{14}$ (1101) | $\frac{V_{\alpha\beta}}{V_D}\cos\theta$ | $\frac{V_{\alpha\beta}}{V_D}\sin(\theta-\frac{\pi}{6})$ |
| III | $\frac{\pi}{2}+2j\pi \leq \theta < \frac{5\pi}{6}+2j\pi$ | $V_{14}$ (1101) | $V_5$ (0100) | $\frac{V_{\alpha\beta}}{V_D}\sin(\theta+\frac{\pi}{6})$ | $-\frac{V_{\alpha\beta}}{V_D}\cos\theta$ |
| IV | $\frac{5\pi}{6}+2j\pi \leq \theta < \frac{7\pi}{6}+2j\pi$ | $V_5$ (0100) | $V_7$ (0110) | $\frac{V_{\alpha\beta}}{V_D}\sin(\theta-\frac{\pi}{6})$ | $-\frac{V_{\alpha\beta}}{V_D}\sin(\theta+\frac{\pi}{6})$ |
| V | $-\frac{5\pi}{6}+2j\pi \leq \theta < -\frac{\pi}{2}+2j\pi$ | $V_7$ (0110) | $V_3$ (0010) | $-\frac{V_{\alpha\beta}}{V_D}\cos\theta$ | $-\frac{V_{\alpha\beta}}{V_D}\sin(\theta-\frac{\pi}{6})$ |
| VI | $-\frac{\pi}{2}+2j\pi \leq \theta < -\frac{\pi}{6}+2j\pi$ | $V_3$ (0010) | $V_{12}$ (1011) | $-\frac{V_{\alpha\beta}}{V_D}\sin(\theta+\frac{\pi}{6})$ | $\frac{V_{\alpha\beta}}{V_D}\cos\theta$ |

When $V_\gamma>0$, the voltage vector $V_\gamma$ can be synthesized from three effective vectors $V_9$, $V_{13}$ and $V_{15}$ which have the same action time. Similarly, when $V_\gamma<0$, the voltage vector $V_\gamma$ can be synthesized from three effective vectors $V_2$, $V_4$ and $V_s$ which have the same action time. The action time of all these effective vectors synthesizing the voltage vector $V_\gamma$ may be set to $T_z$. Since the voltage vectors $V_6$ and $V_{11}$ are not employed, the motion space of the reference vector $V_{\alpha\beta\gamma}$ is in the polyhedron shown in FIG. 5(1). It can be seen that as the amplitude of $V_\gamma$ increases, the maximum amplitude of $V_{\alpha\beta}$ decreases.

Figure 5:
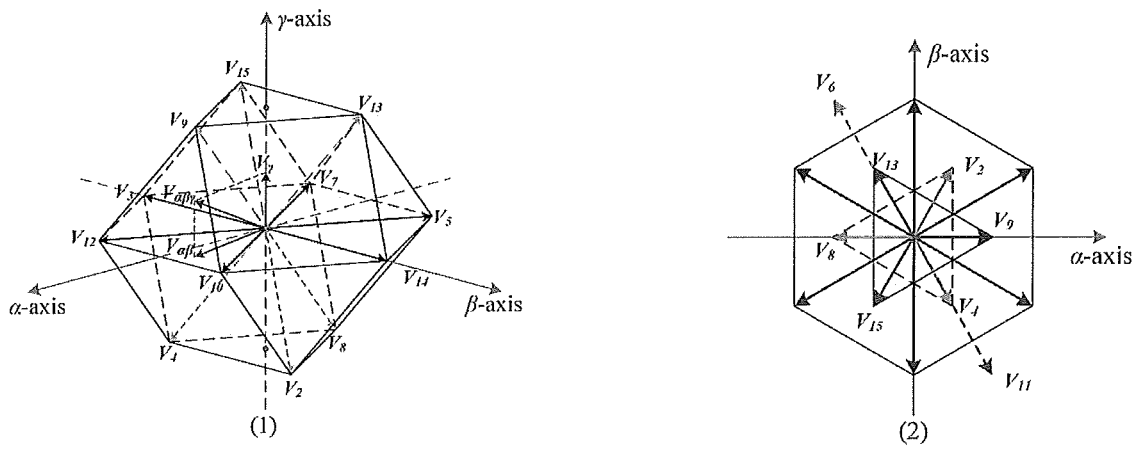
FIG. 5(1) shows a motion range of a reference voltage vector $V_{\alpha\beta\gamma}$ in the $\alpha\beta\gamma$ space.

As shown in FIG. 5(2), all voltage vectors are projected onto the αβ plane. Taking the voltage vector $V_\gamma$ synthesized from three effective vectors $V_9$, $V_{13}$, and $V_{15}$ as an example, the synthesized vector in the αβ plane is zero, and the synthesized vector in the γ axis is:

$$V_\gamma = \frac{T_z}{T_s} \cdot (V_9 + V_{13} + V_{15}) \quad (11)$$

According to FIG. 5(1) and the formula (11), the action time is:

$$T_z = \frac{V_\gamma}{V_D} T_s \quad (12)$$

After considering the action time $T_z$, the action time of the zero vector becomes:

$$T_0 = T_s - T_x - T_y - 3T_z \quad (13)$$

Therefore, assuming that effective vectors synthesizing the voltage vector $V_{\alpha\beta}$ are $V_x$ and $V_y$, the reference voltage vector $V_{\alpha\beta\gamma}$ can be synthesized from seven voltage vectors $V_x$, $V_y$, $V_9$, $V_{13}$, $V_{15}$, $V_1$ and $V_{16}$.

According to the principle of volt-second balance:

$$T_s \cdot V_{\alpha\beta\gamma} = T_x \cdot V_x + T_y \cdot V_y + T_z \cdot (V_9 + V_{13} + V_{15}) + \frac{T_0}{2} \cdot (V_1 + V_{16}) \quad (14)$$

After substituting the formula (13) into the formula (14), pulse widths of the upper switching tubes of the respective bridge arms are obtained as follows:

$$\begin{cases} D_{leg1}T_s = S_{1\_V_x}T_x + S_{1\_V_y}T_y + (S_{1\_V_9} + S_{1\_V_{13}} + S_{1\_V_{15}})T_z + \\ \quad \frac{1}{2}(T_s - T_x - T_y - 3T_z)(S_{1\_V_0} + S_{1\_V_{16}}) \\ D_{leg2}T_s = S_{2\_V_x}T_x + S_{2\_V_y}T_y + (S_{2\_V_9} + S_{2\_V_{13}} + S_{2\_V_{15}})T_z + \\ \quad \frac{1}{2}(T_s - T_x - T_y - 3T_z)(S_{2\_V_0} + S_{2\_V_{16}}) \\ D_{leg3}T_s = S_{3\_V_x}T_x + S_{3\_V_y}T_y + (S_{3\_V_9} + S_{3\_V_{13}} + S_{3\_V_{15}})T_z + \\ \quad \frac{1}{2}(T_s - T_x - T_y - 3T_z)(S_{3\_V_0} + S_{3\_V_{16}}) \\ D_{leg4}T_s = S_{4\_V_x}T_x + S_{4\_V_y}T_y + (S_{4\_V_9} + S_{4\_V_{13}} + S_{4\_V_{15}})T_z + \\ \quad \frac{1}{2}(T_s - T_x - T_y - 3T_z)(S_{4\_V_0} + S_{4\_V_{16}}) \end{cases} \quad (15)$$

where $S_{m\_Vn}$, represents the state of the upper switching tube corresponding to the mth bridge arm in the vector $V_n$. For example, $S_{1\_Vx}$ represents the state of the upper switching tube corresponding to the 1st bridge arm in the vector $V_x$. At this time, $V_x$ can be determined according to the magnitude of θ. For example, if $$-\frac{\pi}{6}+2j\pi < \theta < \frac{\pi}{6}+2j\pi, V_x \text{ is } V_{12}.$$

Referring to Table 1, the states $S_1$, $S_2$, $S_3$ and $S_4$ of the 1st, 2nd, 3rd, and 4th bridge arms corresponding to the voltage vector $V_{12}$ are respectively 1, 0, 1 and 1, and when $-\frac{\pi}{6} + 2j\pi < \theta < \frac{\pi}{6} + 2j\pi$, $S_{1\_Vx}$ is 1.

After substituting $T_Z$ in the formula (12) and $S_{m\_Vn}$ in Table 1 into the formula (15), the relationship between the duty cycle of the respective bridge arm switching device and $V_{\alpha\beta}$, $\theta$, $V\gamma$ can be obtained, as shown in Table 3.

TABLE 3 duty cycle functions of upper switching devices of the respective bridge arms

| Angle (θ) | $-\frac{\pi}{6} + k\pi \leq \theta < \frac{\pi}{6} + k\pi$ | $\frac{\pi}{6} + k\pi \leq \theta < \frac{\pi}{2} + k\pi$ | $\frac{\pi}{2} + k\pi \leq \theta < \frac{5\pi}{6} + k\pi$ |
|---|---|---|---|
| $D_{leg1}$ | $\frac{1}{2}\left(1 + \frac{V_{\alpha\beta}}{V_D}\cos\theta + \frac{3V_\gamma}{V_D}\right)$ | $\frac{1}{2}\left(1 + \frac{V_{\alpha\beta}}{V_D}\sin(\theta + 30°) + \frac{3V_\gamma}{V_D}\right)$ | $\frac{1}{2}\left(1 + \frac{\sqrt{3}V_{\alpha\beta}}{V_D}\sin(\theta + 60°) + \frac{3V_\gamma}{V_D}\right)$ |
| $D_{leg2}$ | $\frac{1}{2}\left(1 - \frac{V_{\alpha\beta}}{V_D}\cos\theta + \frac{V_\gamma}{V_D}\right)$ | $\frac{1}{2}\left(1 + \frac{\sqrt{3}V_{\alpha\beta}}{V_D}\sin(\theta - 60°) + \frac{V_\gamma}{V_D}\right)$ | $\frac{1}{2}\left(1 + \frac{V_{\alpha\beta}}{V_D}\sin(\theta - 30°) + \frac{V_\gamma}{V_D}\right)$ |
| $D_{leg3}$ | $\frac{1}{2}\left(1 - \frac{\sqrt{3}V_{\alpha\beta}}{V_D}\sin\theta - \frac{V_\gamma}{V_D}\right)$ | $\frac{1}{2}\left(1 - \frac{V_{\alpha\beta}}{V_D}\sin(\theta + 30°) - \frac{V_\gamma}{V_D}\right)$ | $\frac{1}{2}\left(1 - \frac{V_{\alpha\beta}}{V_D}\sin(\theta - 30°) + \frac{V_\gamma}{V_D}\right)$ |
| $D_{leg4}$ | $\frac{1}{2}\left(1 + \frac{V_{\alpha\beta}}{V_D}\cos\theta - \frac{3V_\gamma}{V_D}\right)$ | $\frac{1}{2}\left(1 + \frac{V_{\alpha\beta}}{V_D}\sin(\theta + 30°) - \frac{3V_\gamma}{V_D}\right)$ | $\frac{1}{2}\left(1 + \frac{\sqrt{3}V_{\alpha\beta}}{V_D}\sin(\theta + 60°) - \frac{3V_\gamma}{V_D}\right)$ | where $D_{leg1}$, $D_{leg2}$, $D_{leg3}$ and $D_{leg4}$ respectively represent duty cycles of the upper power switching devices of the 1st, 2nd, 3rd, and 4th bridge arms, and k is an integer.

Accordingly, when the voltage vector V is synthesized from effective vectors $V_2$, $V_4$ and $V_8$, that is, $$V_\gamma = \frac{T_z}{T_s} \cdot (V_2 + V_4 + V_8),$$

the reference voltage vector $V_{\alpha\beta\gamma}$ can be synthesized from the vectors $V_x$, $V_y$, $V_2$, $V_4$, $V_8$, $V_0$ and $V_{16}$. Similarly, pulse widths of the upper switching tubes of the respective bridge arms can be obtained as follows:

$$\begin{cases} D_{leg1}T_s = S_{1\_V_x}T_x + S_{1\_V_y}T_y + (S_{1\_V_2} + S_{1\_V_4} + S_{1\_V_8})T_z + \\ \quad \frac{1}{2}(T_s - T_x - T_y - 3T_z)(S_{1\_V_0} + S_{1\_V_{16}}) \\ D_{leg2}T_s = S_{2\_V_x}T_x + S_{2\_V_y}T_y + (S_{2\_V_2} + S_{2\_V_4} + S_{2\_V_8})T_z + \\ \quad \frac{1}{2}(T_s - T_x - T_y - 3T_z)(S_{2\_V_0} + S_{2\_V_{16}}) \\ D_{leg3}T_s = S_{3\_V_x}T_x + S_{3\_V_y}T_y + (S_{3\_V_2} + S_{3\_V_4} + S_{3\_V_8})T_z + \\ \quad \frac{1}{2}(T_s - T_x - T_y - 3T_z)(S_{3\_V_0} + S_{3\_V_{16}}) \\ D_{leg4}T_s = S_{4\_V_x}T_x + S_{4\_V_y}T_y + (S_{4\_V_2} + S_{4\_V_4} + S_{4\_V_8})T_z + \\ \quad \frac{1}{2}(T_s - T_x - T_y - 3T_z)(S_{4\_V_0} + S_{4\_V_{16}}) \end{cases} \quad (16)$$

After final derivation, Table 3 still holds when the voltage vector $V_\gamma$ is synthesized from the effective vectors $V_2$, $V_4$, and $V_8$.

Figure 6:
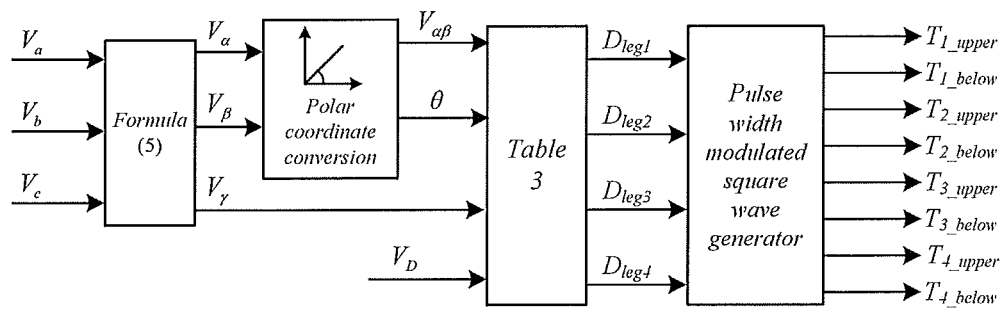
FIG. 6 is a schematic structural diagram of a modulation algorithm according to the present invention.

In summary, the modulation process of the four bridge arms can be as shown in FIG. 6. Firstly, a A-phase stator voltage, a B-phase stator voltage and a C-phase stator voltage are respectively converted into $V_\alpha$, $V_\beta$, and $V_\gamma$ according to the formula (5). Subsequently, according to the polar coordinate conversion, $V_{\alpha\beta}$ and $\theta$ are obtained from $V_\alpha$ and $V_\beta$. Then, according to Table 3, duty cycles of the upper power switching devices of the respective bridge arms are obtained. Finally, according to these duty cycles, pulse width modulated square waves are generated as driving signals of the power switching devices of the respective bridge arms, in which $T_{m\_upper}$ represents a pulse drive signal of an upper switching device of the mth bridge arm, $T_{m\_below}$, represents a pulse drive signal of a lower switching device of the mth bridge arm, and m=1, 2, 3, 4. Further, $T_{m\_upper}$ and $T_{m\_below}$, are complementary drive signals.

The present invention provides an open-winding motor drive topology and a modulation method thereof, which solves the technical problem of large number of power devices and low power density in existing motor drive devices under the premise of ensuring the DC bus voltage utilization.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. An open-winding motor drive topology, characterized by comprising: a first bridge arm, a second bridge arm, a third bridge arm and a fourth bridge arm;

each bridge arm includes an upper bridge arm power switching device and a lower bridge arm power switching device, in which an upper node of the upper bridge arm power switching device is connected to a DC bus voltage, a lower node of the lower bridge arm power switching device is connected to a power ground, and a lower node of the upper bridge arm power switching device and an upper node of the lower bridge arm power switching device are connected as an output node of the bridge arm;

the output node of the first bridge arm is connected to a left node of a A-phase stator winding of the open-winding motor, the output node of the second bridge arm is connected to a right node of the A-phase stator winding and a left node of a B-phase stator winding of the open-winding motor, the output node of the third bridge arm is connected to a right node of the B-phase stator winding and a left node of a C-phase stator winding of the open-winding motor, and the output node of the fourth bridge arm is connected to a right node of the C-phase stator winding of the open-winding motor.

2. The open-winding motor drive topology of claim 1, characterized in that currents flowing into the respective bridge arms are expressed by stator currents of the stator DC excitation motor:

$$\begin{cases} i_1 = -i_A = -\sqrt{2}\,I_{AC}\sin\omega t - I_{DC} \\ i_2 = i_A - i_B = \sqrt{6}\,I_{AC}\sin(\omega t + 30°) \\ i_3 = i_B - i_C = \sqrt{6}\,I_{AC}\sin(\omega t - 90°) \\ i_4 = i_C = \sqrt{2}\,I_{AC}\sin(\omega t + 120°) + I_{DC} \end{cases}$$

wherein $i_1$, $i_2$, $i_3$ and $i_4$ respectively represent currents flowing into the first bridge arm, the second bridge arm, the third bridge arm and the fourth bridge arm; $i_A$, $i_B$ and $i_C$ respectively represent currents of a A-phase stator winding, a B-phase stator winding and a C-phase stator winding; $I_{AC}$ represents an effective value of a AC current component in the stator winding current, $I_{DC}$ represents an effective value of a DC current component in the stator winding current, $I_{DC}$ belongs to a zero-sequence current component in the three-phase stator currents of the motor, the zero-sequence current component being the same current component in the three-phase stator currents, ω represents an electrical angular velocity, and t represents the time.

3. The open-winding motor drive topology of claim 2, characterized in that currents flowing into the first bridge arm and the fourth bridge arm are each a DC-biased sinusoidal current, and the current stresses of the bridge arm power devices are related to all components in the stator current;

currents flowing into the second bridge arm and the third bridge arm are each a sinusoidal current, and the current stresses of the bridge arm power devices are independent of the DC component in the stator current, i.e., the zero-sequence current component; the zero-sequence current component does not flow into the second bridge arm and the third bridge arm, and when the required zero-sequence current component of the motor is large, the current stresses of the second bridge arm and the third bridge arm are relatively small, thereby allowing small-capacity power devices to be selected and reducing the cost.

4. The open-winding motor drive topology of claim 2, characterized in that when three-phase stator voltages are set to $V_A$, $V_B$ and $V_C$, duty cycles of the upper bridge arm power switching devices of the respective bridge arms are:

when $-\frac{\pi}{6} + k\pi \leq \theta < \frac{\pi}{6} + k\pi$, $D_{leg1} = \frac{1}{2}\left(1 + \frac{V_{\alpha\beta}}{V_D}\cos\theta + \frac{3V_\gamma}{V_D}\right)$, $D_{leg2} = \frac{1}{2}\left(1 + \frac{V_{\alpha\beta}}{V_D}\cos\theta + \frac{V_\gamma}{V_D}\right)$, $D_{leg3} = \frac{1}{2}\left(1 - \frac{\sqrt{3}\,V_{\alpha\beta}}{V_D}\sin\theta - \frac{V_\gamma}{V_D}\right)$, and $D_{leg4} = \frac{1}{2}\left(1 + \frac{V_{\alpha\beta}}{V_D}\cos\theta - \frac{3V_\gamma}{V_D}\right)$;

when $\frac{\pi}{6} + k\pi \leq \theta < \frac{\pi}{2} + k\pi$, $D_{leg1} = \frac{1}{2}\left(1 + \frac{V_{\alpha\beta}}{V_D}\sin(\theta + 30°) + \frac{3V_\gamma}{V_D}\right)$, $D_{leg2} = \frac{1}{2}\left(1 + \frac{\sqrt{3}\,V_{\alpha\beta}}{V_D}\sin(\theta - 60°) + \frac{V_\gamma}{V_D}\right)$, $D_{leg3} = \frac{1}{2}\left(1 - \frac{V_{\alpha\beta}}{V_D}\sin(\theta + 30°) - \frac{V_\gamma}{V_D}\right)$, and $D_{leg4} = \frac{1}{2}\left(1 + \frac{V_{\alpha\beta}}{V_D}\sin(\theta + 30°) - \frac{3V_\gamma}{V_D}\right)$;

when $\frac{\pi}{2} + k\pi \leq \theta < \frac{5\pi}{6} + k\pi$, $D_{leg1} = \frac{1}{2}\left(1 + \frac{\sqrt{3}\,V_{\alpha\beta}}{V_D}\sin(\theta + 60°) + \frac{3V_\gamma}{V_D}\right)$, $D_{leg2} = \frac{1}{2}\left(1 + \frac{V_{\alpha\beta}}{V_D}\sin(\theta - 30°) + \frac{V_\gamma}{V_D}\right)$, $D_{leg3} = \frac{1}{2}\left(1 - \frac{V_{\alpha\beta}}{V_D}\sin(\theta - 30°) - \frac{V_\gamma}{V_D}\right)$, $D_{leg4} = \frac{1}{2}\left(1 + \frac{\sqrt{3}\,V_{\alpha\beta}}{V_D}\sin(\theta + 60°) - \frac{3V_\gamma}{V_D}\right)$;

wherein $D_{leg1}$, $D_{leg2}$, $D_{leg3}$ and $D_{leg4}$ respectively represent duty cycles of the upper bridge arm power switching devices of the first bridge arm, the second bridge arm, the third bridge arm and the fourth bridge arm, θ represents an angle between a voltage vector $V_{\alpha\beta}$ and the α axis in a stationary αβγ coordinate system, $V_{\alpha\beta} = \sqrt{V_\alpha^2 + V_\beta^2}$, θ=arctan($V_\beta/V_\alpha$), and k is an integer;

$V_\alpha$, $V_\beta$ and $V_\gamma$ are voltage vectors, which are converted from the three-phase stator voltages $V_A$, $V_B$ and $V_C$, in the respective axes of the αβγ axis space, and a relationship between $V_A$, $V_B$ and $V_C$ and $V_\alpha$, $V_\beta$ and $V_\gamma$ is:

$$\begin{bmatrix} V_\alpha \\ V_\beta \\ V_\gamma \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} V_a \\ V_b \\ V_c \end{bmatrix}.$$

5. A modulation method for the open-winding motor drive topology of claim 1, characterized by comprising:
converting a A-phase stator voltage $V_A$, a B-phase stator voltage $V_B$ and a C-phase stator voltage $V_C$ required to be generated by the open-winding motor drive into voltage vectors $V_\alpha$, $V_\beta$ and $V_\gamma$ in respective axes of the αβγ axis space, $V_A$, $V_B$ and $V_C$ being determined by the closed-loop control output of a A-phase stator current, a B-phase stator current and a C-phase stator current;
determining sixteen voltage vectors that is capable of being generated by the open-winding motor drive topology in the αβγ axis space;
selecting seven voltage vectors of the sixteen voltage vectors to synthesize required $V_\alpha$, $V_\gamma$ and $V_\gamma$;
according to the selected seven voltage vectors and $V_\alpha$, $V_\beta$ and $V_\gamma$, determining a modulation method in the open-winding motor drive topology to control duty cycles of the power switching devices of the respective bridge arms such that the A-phase stator voltage $V_A$, the B-phase stator voltage $V_B$ and the C-phase stator voltage $V_C$ are generated when the motor works properly.

6. The modulation method of claim 5, characterized in that the sixteen voltage vectors are respectively set to $V_1$ to $V_{16}$, each corresponding to a combination of switching states of power switching devices on the respective bridge arms;

when selecting seven voltage vectors of the sixteen voltage vectors to synthesize required $V_\alpha$, $V_\beta$ and $V_\gamma$:

$$T_s \cdot V_{\alpha\beta} = T_x \cdot V_x + T_y \cdot V_y + \frac{T_0}{2} \cdot (V_1 + V_{16})$$

where $T_s$ represents a switching period, $T_x$ represents an effective action time of $V_x$, $T_y$ represents an effective action time of $V_y$, $V_x$ and $V_y$ represents two effective vectors of the motor voltage vector $V_{\alpha\beta}$, $V_{\alpha\beta} = \sqrt{V_\alpha^2 + V_\beta^2}$, $V_x$ and $V_y$ takes two of the sixteen voltage vectors $V_1$ to $V_{16}$ according to an angle $\theta$ ($\theta$=arctan$(V_\beta/V_\alpha)$) between the voltage vector $V_{\alpha\beta}$ and the $\alpha$ axis in the stationary $\alpha\beta\gamma$ coordinate system, $T_0/2$ represents an effective time of the zero vectors $V_1$ and $V_{16}$, and $T_s = T_x + T_y + T_0$;

when $V_\gamma > 0$, $V_\gamma = \frac{T_z}{T_s} \cdot (V_9 + V_{13} + V_{15})$, when $V_\gamma < 0$, $V_\gamma = \frac{T_z}{T_s} \cdot (V_2 + V_4 + V_8)$, $T_z$ represents an action time of three effective vectors;
when $V_\gamma > 0$, the seven voltage vectors are $V_x$、$V_y$、$V_1$、$V_{16}$、$V_9$、$V_{13}$ and $V_{15}$, and when $V_\gamma < 0$, the seven voltage vectors are $V_x$、$V_y$、$V_1$、$V_{16}$、$V_2$、$V_4$ and $V_8$;
a relationship between $V_A$, $V_B$ and $V_C$ and $V_\alpha$, $V_\beta$ and $V_\gamma$ is:

$$\begin{bmatrix} V_\alpha \\ V_\beta \\ V_\gamma \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} V_a \\ V_b \\ V_c \end{bmatrix}.$$

7. The modulation method of claim 6, characterized in that, when $-\frac{\pi}{6} + 2j\pi \leq \theta < \frac{\pi}{6} + 2j\pi$, $V_x$ is $V_{12}$, $V_y$ is $V_{10}$, $\frac{T_x}{T_s} = -\frac{V_{\alpha\beta}}{V_D}\sin(\theta - \frac{\pi}{6})$, $\frac{T_y}{T_s} = \frac{V_{\alpha\beta}}{V_D}\sin(\theta + \frac{\pi}{6})$;

when $\frac{\pi}{6} + 2j\pi \leq \theta < \frac{\pi}{2} + 2j\pi$, $V_x$ is $V_{10}$, $V_y$ is $V_{14}$, $\frac{T_x}{T_s} = \frac{V_{\alpha\beta}}{V_D}\cos\theta$, $\frac{T_y}{T_s} = \frac{V_{\alpha\beta}}{V_D}\sin(\theta - \frac{\pi}{6})$;

when $\frac{\pi}{2} + 2j\pi \leq \theta < \frac{5\pi}{6} + 2j\pi$, $V_x$ is $V_{14}$, $V_y$ is $V_5$, $\frac{T_x}{T_s} = \frac{V_{\alpha\beta}}{V_D}\sin(\theta + \frac{\pi}{6})$, $\frac{T_y}{T_s} = -\frac{V_{\alpha\beta}}{V_D}\cos\theta$;

when $\frac{5\pi}{6} + 2j\pi \leq \theta < \frac{7\pi}{6} + 2j\pi$, $V_x$ is $V_5$, $V_y$ is $V_7$, $\frac{T_x}{T_s} = \frac{V_{\alpha\beta}}{V_D}\sin(\theta - \frac{\pi}{6})$, $\frac{T_y}{T_s} = -\frac{V_{\alpha\beta}}{V_D}\sin(\theta + \frac{\pi}{6})$;

when $-\frac{5\pi}{6} + 2j\pi \leq \theta < -\frac{\pi}{2} + 2j\pi$, $V_x$ is $V_7$, $V_y$ is $V_3$, $\frac{T_x}{T_s} = \frac{V_{\alpha\beta}}{V_D}\cos\theta$, $\frac{T_y}{T_s} = -\frac{V_{\alpha\beta}}{V_D}\sin(\theta - \frac{\pi}{6})$;

when $-\frac{\pi}{2} + 2j\pi \leq \theta < -\frac{\pi}{6} + 2j\pi$, $V_x$ is $V_3$, $V_y$ is $V_{12}$, $\frac{T_x}{T_s} = -\frac{V_{\alpha\beta}}{V_D}\sin(\theta + \frac{\pi}{6})$, $\frac{T_y}{T_s} = \frac{V_{\alpha\beta}}{V_D}\cos\theta$;

j represents an integer, $V_D$ represents an DC bus voltage of the open-winding motor drive.

8. The modulation method of claim 7, characterized in that, duty cycles of the upper bridge arm power switching devices of the respective bridge arms are controlled as follows:

when $-\frac{\pi}{6} + k\pi \leq \theta < \frac{\pi}{6} + k\pi$, $D_{leg1} = \frac{1}{2}\left(1 + \frac{V_{\alpha\beta}}{V_D}\cos\theta + \frac{3V_\gamma}{V_D}\right)$, $D_{leg2} = \frac{1}{2}\left(1 - \frac{V_{\alpha\beta}}{V_D}\cos\theta + \frac{V_\gamma}{V_D}\right)$, $D_{leg3} = \frac{1}{2}\left(1 - \frac{\sqrt{3}V_{\alpha\beta}}{V_D}\sin\theta - \frac{V_\gamma}{V_D}\right)$, $D_{leg4} = \frac{1}{2}\left(1 + \frac{V_{\alpha\beta}}{V_D}\cos\theta - \frac{3V_\gamma}{V_D}\right)$;

when $\frac{\pi}{6} + k\pi \leq \theta < \frac{\pi}{2} + k\pi$, $D_{leg1} = \frac{1}{2}\left(1 + \frac{V_{\alpha\beta}}{V_D}\sin(\theta + 30°) + \frac{3V_\gamma}{V_D}\right)$, $D_{leg2} = \frac{1}{2}\left(1 + \frac{\sqrt{3}V_{\alpha\beta}}{V_D}\sin(\theta - 60°) + \frac{V_\gamma}{V_D}\right)$, $D_{leg3} = \frac{1}{2}\left(1 - \frac{V_{\alpha\beta}}{V_D}\sin(\theta + 30°) - \frac{V_\gamma}{V_D}\right)$, $D_{leg4} = \frac{1}{2}\left(1 + \frac{V_{\alpha\beta}}{V_D}\sin(\theta + 30°) - \frac{3V_\gamma}{V_D}\right)$;

when $\frac{\pi}{2} + k\pi \leq \theta < \frac{5\pi}{6} + k\pi$, $D_{leg1} = \frac{1}{2}\left(1 + \frac{\sqrt{3}V_{\alpha\beta}}{V_D}\sin(\theta + 60°) + \frac{3V_\gamma}{V_D}\right)$, $D_{leg2} = \frac{1}{2}\left(1 + \frac{V_{\alpha\beta}}{V_D}\sin(\theta - 30°) + \frac{V_\gamma}{V_D}\right)$, $D_{leg3} = \frac{1}{2}\left(1 - \frac{V_{\alpha\beta}}{V_D}\sin(\theta - 30°) - \frac{V_\gamma}{V_D}\right)$, $D_{leg4} = \frac{1}{2}\left(1 + \frac{\sqrt{3}V_{\alpha\beta}}{V_D}\sin(\theta + 60°) - \frac{3V_\gamma}{V_D}\right)$;

where $D_{leg1}$, $D_{leg2}$, $D_{leg3}$ and $D_{leg4}$ respectively represent duty cycles of the upper bridge arm power switching devices of the first, second, third and fourth bridge arms, and k is an integer.

* * * * *